United States Patent
Srinivas et al.

(10) Patent No.: US 11,958,444 B2
(45) Date of Patent: Apr. 16, 2024

(54) WIPER COMPOSITE BEAM BLADE WITH INTERNAL WASH TUBE

(71) Applicant: Rosemount Aerospace Inc., Burnsville, MN (US)

(72) Inventors: Nouduri Phani Srinivas, Bangalore (IN); Murugan Kuppuswamy, Bangalore (IN)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 0 days.

(21) Appl. No.: 17/651,109

(22) Filed: Feb. 15, 2022

(65) Prior Publication Data
US 2023/0116759 A1    Apr. 13, 2023

(30) Foreign Application Priority Data
Oct. 9, 2021 (IN) .............. 202141046062

(51) Int. Cl.
| | | |
|---|---|---|
| *B60S 1/52* | (2006.01) | |
| *B60S 1/34* | (2006.01) | |
| *B60S 1/38* | (2006.01) | |

(52) U.S. Cl.
CPC ............. *B60S 1/524* (2013.01); *B60S 1/3862* (2013.01); *B60S 1/3415* (2013.01);
(Continued)

(58) Field of Classification Search
CPC .......... B60S 1/524; B60S 1/52; B60S 1/3415; B60S 1/522; B60S 1/38; B60S 2001/3812; B60S 2001/3822; B60S 1/3862; B60S 1/3851; B60S 1/3874; B60S 1/3875; B60S 2001/382
(Continued)

(56) References Cited

U.S. PATENT DOCUMENTS 2,910,715 A * 11/1959 Ohrt .................. B60S 1/524
                                                    15/250.04
3,418,676 A * 12/1968 Byczkowski ............ B60S 1/48
                                                    15/250.07
(Continued)

FOREIGN PATENT DOCUMENTS

| BR | PI0709139 A2 | 6/2011 |
|---|---|---|
| CN | 103707850 A | 4/2014 |

(Continued)

OTHER PUBLICATIONS

Machine translation of description portion of French publication 2648771, published Dec. 1990. (Year: 1990).*
(Continued)

*Primary Examiner* — Gary K. Graham
(74) *Attorney, Agent, or Firm* — Kinney & Lange, P.A.

(57) ABSTRACT

An aircraft windshield wiper system includes a wiper blade with a composite support member and a blade element that interfaces with the windshield of the aircraft to clear the windshield of rain and other debris. The composite support member includes a wash tube integral with the composite support member, such that the wash tube receives windshield washing fluid from a fluid reservoir and dispenses the fluid onto the windshield of the aircraft. A plurality of clips can be used to couple the composite support member to the blade element.

16 Claims, 4 Drawing Sheets

(52) U.S. Cl.
CPC .. *B60S 2001/3812* (2013.01); *B60S 2001/382* (2013.01); *B60S 2001/3822* (2013.01)

(58) Field of Classification Search
USPC ............ 15/250.04, 250.43, 250.44, 250.361
See application file for complete search history.

(56) References Cited

U.S. PATENT DOCUMENTS

| | | | |
|---|---|---|---|
| 3,757,379 A | 9/1973 | Benson | |
| 3,854,161 A | 12/1974 | Benson | |
| 4,123,817 A * | 11/1978 | Hartery | B60S 1/524 |
| | | | 15/250.04 |
| 4,517,704 A | 5/1985 | Benson | |
| 5,383,247 A * | 1/1995 | Nickel | B60S 1/546 |
| | | | 15/250.04 |
| 5,842,251 A | 12/1998 | Lefrancois et al. | |
| 6,026,537 A | 2/2000 | Hojnacki | |
| 6,253,411 B1 * | 7/2001 | Aichele | B29C 70/50 |
| | | | 15/250.43 |
| 6,766,553 B2 * | 7/2004 | Wilson | B60S 1/3882 |
| | | | 15/250.04 |
| 7,165,287 B2 | 1/2007 | Buchanan | |
| 8,225,455 B1 | 7/2012 | Blus et al. | |
| 9,045,114 B2 | 6/2015 | Weber | |
| 9,963,116 B2 * | 5/2018 | Barret | B60S 1/524 |
| 10,759,390 B2 | 9/2020 | Rapp et al. | |
| 2006/0265830 A1 * | 11/2006 | Walworth | B60S 1/38 |
| | | | 15/236.02 |
| 2016/0129890 A1 * | 5/2016 | Thebault | B60S 1/38 |
| | | | 15/250.04 |
| 2022/0289145 A1 * | 9/2022 | Hitnalli | B60S 1/38 |

FOREIGN PATENT DOCUMENTS

| | | |
|---|---|---|
| DE | 10323998 A1 | 12/2004 |
| DE | 102015218682 A1 | 3/2017 |
| FR | 2648771 * | 12/1990 |

OTHER PUBLICATIONS

Extended European Search Report for EP Application No. 22200034.1, dated Feb. 13, 2023, pp. 5.
Extended European Search Report for EP Application No. 22200277.6, dated Feb. 13, 2023, pp. 6.

* cited by examiner

WIPER COMPOSITE BEAM BLADE WITH INTERNAL WASH TUBE

CROSS-REFERENCE TO RELATED APPLICATION(S)

This application claims the benefit of India Provisional Application No. 202141046062 filed Oct. 9, 2021 for "WIPER COMPOSITE BEAM BLADE WITH INTERNAL WASH TUBE" by N. P. Srinivas and M. Kuppuswamy.

BACKGROUND

The present disclosure relates to windshield wiper systems, and in particular to a windshield wiper system used on an aircraft.

Aircraft windshield wiper systems are used to wipe and clean water or other debris from an aircraft windshield, allowing better visibility out the windshield for both the pilot and co-pilot. Windshield wiper systems include a wiper arm and a wiper blade that sweep back and forth across a windshield within specific sweep angle requirements, cleaning the windshield for the pilot and co-pilot. Many windshield wiper systems include a wash system that dispenses a fluid onto the windshield of the aircraft to aid in cleaning the windshield of the aircraft. Windshield wiper systems utilizing metallic supports have a fluid tube welded or brazed to the metallic components for providing fluid adjacent the wiper blade sweeping across the windshield. Windshield wiper systems utilizing composite supports cannot include welded or brazed fluid tubes and therefore there is a need for a solution to incorporate fluid tubes into composite support type wiper blade assemblies.

SUMMARY

According to one aspect of the disclosure, a wiper blade for use on a windshield of an aircraft is disclosed. The wiper blade includes a support member, a blade element, a wash tube, and a plurality of nozzles. The support member is coupled to the blade element, and the support member is constructed from a composite material. The wash tube extends through a central portion of the support member and the plurality of nozzles are spaced along a length of the support member. The wash tube is fluidly coupled to the plurality of nozzles.

DETAILED DESCRIPTION

Figure 1:
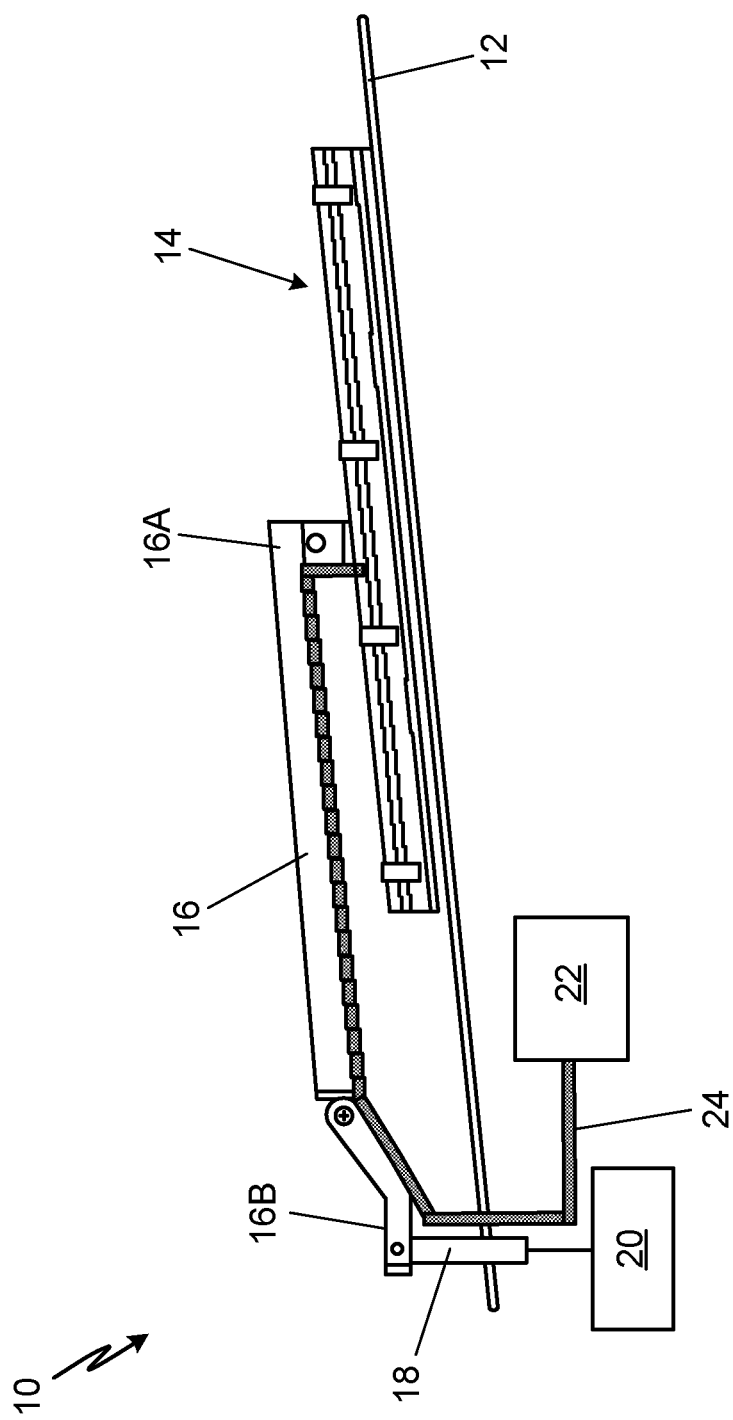
FIG. 1 is a side view of a windshield wiper system on an aircraft windshield.

FIG. 1 is a side view of windshield wiper system 10 on aircraft windshield 12. Hereinafter windshield wiper system 10 will be referred to as WWS 10. WWS 10 includes wiper blade 14, wiper arm 16, output shaft 18, actuator 20, fluid source 22, and fluid line 24. WWS 10 is installed on an aircraft and WWS 10 is configured to clear windshield 12 of rain or other debris. Wiper arm 16 includes first end 16A positioned at a distal end of wiper arm 16 and second end 16B positioned at an opposite distal end of wiper arm 16 as first end 16A. Wiper blade 14 is coupled to first end 16A of wiper arm 16 through a coupler, discussed further below. Wiper arm 16 can be constructed from a polymer, a composite, a metal, or at least partially from one or more of the listed materials.

Wiper arm 16 is coupled to output shaft 18 at second end 16B of wiper arm 16 through a mechanical connection, such as a threaded or clamping connection. Output shaft 18 extends through a body portion of the aircraft adjacent windshield 12 but not through windshield 12. Output shaft 18 is configured to rotate about its central axis, providing rotational energy to second end 16B of wiper arm 16, which in turn forces wiper arm 16 and wiper blade 14 to traverse across windshield 12 in a sweeping motion. Actuator 20 is coupled to output shaft 18 within the body portion of the aircraft. Actuator 20 is configured to provide rotational energy to output shaft 18, rotating output shaft 18 about its central axis. The rotation of output shaft 18 forces wiper arm 16 and wiper blade 14 to traverse across windshield 12 in a sweeping motion, therefore actuator 20 provides the energy necessary to drive motion of WWS 10. In the embodiment shown, actuator 20 is a brushless direct current motor. In another embodiment, actuator 20 can be a brushed direct current motor or any other motor configured to provide rotational energy to output shaft 18. Further, actuator 20 is a bi-directional motor that can operate in both directions, allowing output shaft 18, wiper arm 16, and wiper blade 14 to travel across windshield 12 in both directions.

In one example, fluid source 22 can be an impermeable vessel of any shape, size, and material that is configured to store the fluid that will be dispensed onto windshield 12. In other words, fluid source 22 can be a leak proof container that includes a hollow interior configured to store fluids before the fluids are used by WWS 10. In other examples, fluid source 22 can be a flow path from a portion of an engine, compressor, auxiliary power unit, or any other hot air source within the aircraft, such as for example to provide engine bleed air to WWS 10. Fluid source 22 is positioned within the aircraft body and fluidly coupled to wiper blade 14 through fluid line 24, discussed further below. Fluid line 24 extends from fluid source 22 to wiper blade 14. Fluid line 24 can be a tube, channel, hose, or any other component capable of transferring a fluid from fluid source 22 to wiper blade 14. The fluid transferring through fluid line 24 can be one or more of water, windshield cleaning fluid, chemical rain repellant, and hot engine bleed air, among other options. Fluid line 24 is configured to provide a flow path for fluid to flow from fluid source 22 to wiper blade 14, allowing the fluid to dispense onto windshield 12 adjacent wiper blade 14. In the embodiment shown, fluid line 24 is coupled to wiper blade 14 at approximately the center of wiper blade 14, with respect to the length of wiper blade 14. In another embodiment, fluid line 24 can be coupled to wiper blade 14 at any location along the length of wiper blade 14.

Figure 2A:
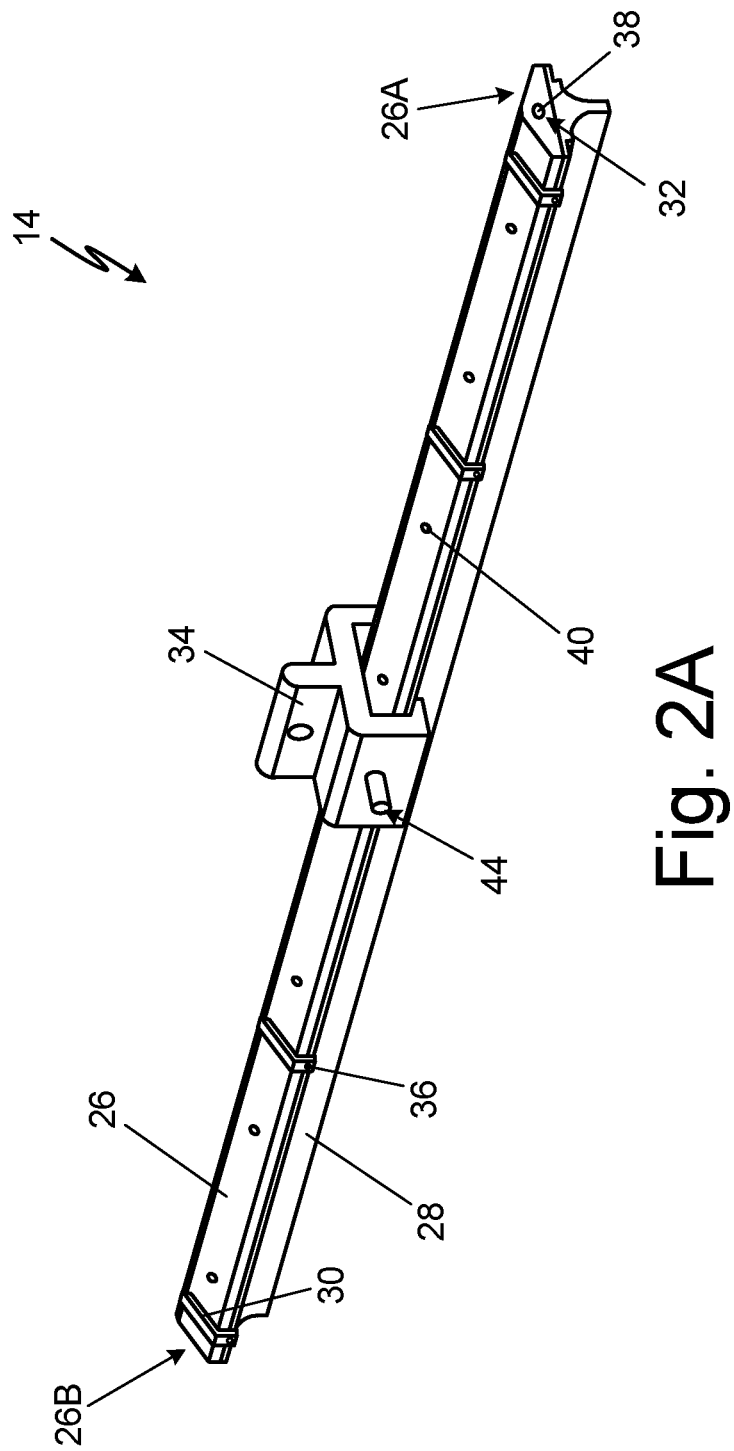
FIG. 2A is a perspective view of a wiper blade of the windshield wiper system.
Figure 2B:
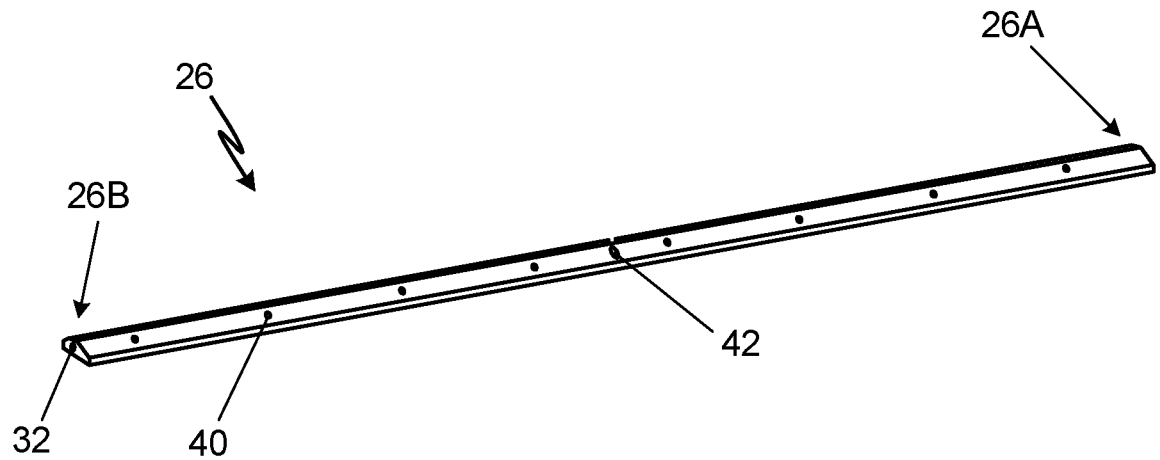
FIG. 2B is a perspective view of the composite support member of the wiper blade.
Figure 2C:
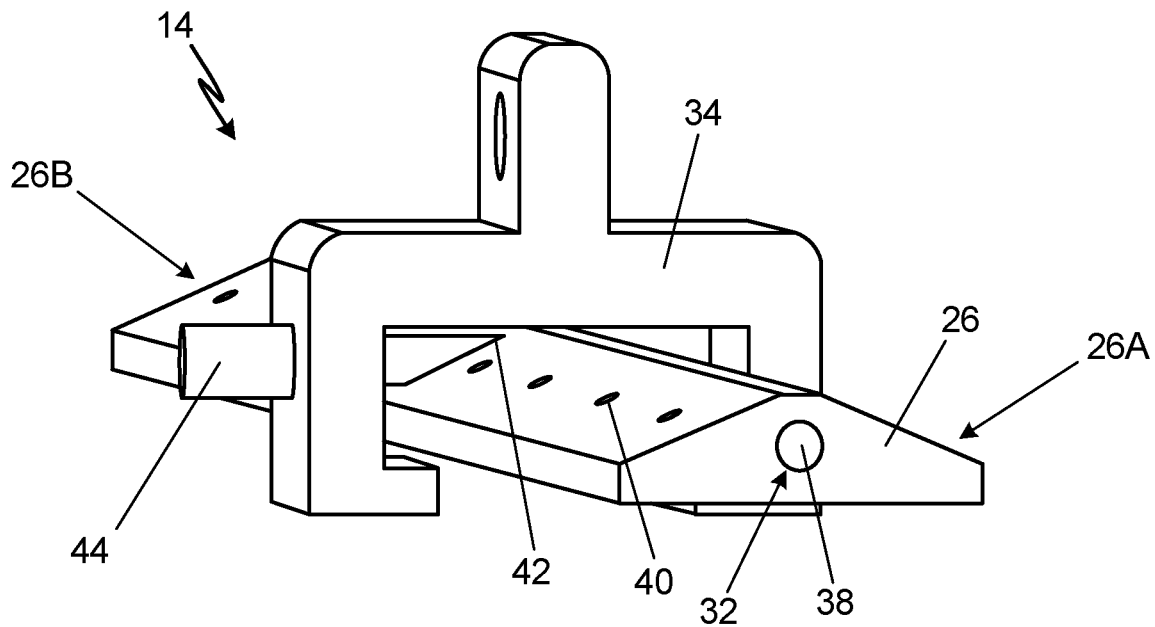
FIG. 2C is a close-up perspective view of the wiper blade with the rubber blade element removed.

FIG. 2A is a perspective view of wiper blade 14 of WWS 10. FIG. 2B is a perspective view of the support member of wiper blade 14. FIG. 2C is a close-up perspective view of wiper blade 14 with the rubber blade element removed for clarity. FIGS. 2A-2C will be discussed together. Wiper blade 14 includes support member 26, blade element 28, clips 30, wash tube 32, coupler 34, and fastener 36. Support member 26 is coupled to blade element 28 and clip 30 is coupled to and surrounds at least a portion of support member 26 and at least a portion of blade element 28. Likewise, coupler 34 is coupled to and surrounds at least a portion of support member 26 and at least a portion of blade element 28. Fastener 36 extends through blade element 28 and clip 30, securing clip 30 to blade element 28. Each respective component will be discussed further below.

Support member 26 is a structural component that provides rigidity to wiper blade 14 during operation of WWS 10. In the embodiment shown, support member 26 includes a generally triangular cross-section extending the length of wiper blade 14, providing stiffness and rigidity to wiper blade 14 to prevent undesirable deflection of wiper blade 14 in the sweeping directions. Further, the generally triangular cross-section reduces drag of wiper blade 14 during operation of WWS 10. In another embodiment, support member 26 can include a cross-section of any shape that extends a full or partial length of wiper blade 14. Support member 26 can be constructed from a composite material, metallic material, or polymer material, discussed in detail with reference to FIG. 3. In one example, support member 26 can be constructed from a carbon fiber reinforced polymer, polytetrafluoroethylene (PTFE) composite material, or other comparable composite material. Support member 26 is coupled to blade element 28 through an adhesive positioned between support member 26 and blade element 28 and extending a substantial length of support member 26. In one example, the adhesive used to couple support member 26 to blade element 28 is a polyurethane adhesive.

Blade element 28 is the component of wiper blade 14 that is configured to interface with windshield 12 to clear windshield 12 of water or other debris. Blade element 28 has a complex cross-sectional shape including a rectangular top portion and a generally triangular bottom portion configured to contact and clean windshield 12 on the aircraft. Blade element 28 can be constructed from a rubber material, such as in one example blade element 28 is constructed from a nitrile rubber. In some examples, blade element 28 can have a length that is less than a length of support member 26. During the adhesion of support member 26 to blade element 28, blade element 28 is stretched which causes support member 26 to flex into a curved configuration, conforming to the shape of windshield 12. In other examples, blade element 28 can have the same length as support member 26.

Clip 30 is a component of wiper blade 14 that is configured to provide additional attachment support between support member 26 and blade element 28. More specifically, clip 30 is coupled to both support member 26 and blade element 28, and clip 30 surrounds at least a portion of each of support member 26 and blade element 28. Clip 30 is configured to exert a clamping force on support member 26 and blade element 28, compressing support member 26 and blade element 28 together. Fastener 36 is configured to extend through only clip 30 and the rectangular top portion of blade element 28 to secure clip 30 to blade element 28, which further secures support member 26 and blade element 28 together in compression. Fastener 36 does not extend through support member 26 in an effort to eliminate unnecessary apertures within support member 26. Fastener 36 can extend through each clip 30 coupled to support member 26 and blade element 28. As such, in an embodiment including four clips 30, there will be four fasteners 36 securing the four clips 30 to support member 26 and blade element 28. The number of fasteners 36 will depend on the number of clips 30 on wiper blade 14. Fastener 36 can be a rivet, bolt and nut, pin and clevis, pin and clamp, among other options.

Clip 30 can be constructed from a metal, a polymer, or a composite material. In one example, clip 30 can be constructed from a spring steel or sheet metal to facilitate the clamping force exerted on support member 26 and blade element 28. In the embodiment shown in FIG. 2A, wiper blade 14 includes four clips 30 coupled to support member 26 and blade element 28. In another example, wiper blade 14 can include more or less than four clips 30 coupled to support member 26 and blade element 28. The number of clips 30 coupled to wiper blade 14 depends on various factors, such as the length of wiper blade 14 and the forces exerted on wiper blade 14, among other factors. In one example, wiper blade 14 includes two inner clips 30 spaced equidistance from coupler 34 and two outer clips 30 adjacent the ends of wiper blade 14 that are also spaced equidistance from coupler 34. Further, in the example shown, there are an equal number of clips 30 positioned on each side of coupler 34. In another example, there can be an unequal number of clips 30 positioned on each side of coupler 34. In other examples, wiper blade 14 may not include any clips 30, such that an adhesive positioned between support member 26 and blade element 28 secures the components together.

Coupler 34 is positioned at a center position with respect to a length of support member 26 and coupler 34 extends outward from support member 26 in a direction opposite of blade element 28. Similar to clip 30, coupler 34 is coupled to and surrounds at least a portion of support member 26 and at least a portion of blade element 28. Coupler 34 is configured to couple to support member 26 and blade element 28 at one end and couple to first end 16A of wiper arm 16 at the other end. As such, coupler 34 is configured to secure wiper blade 14 to wiper arm 16 of WWS 10 (FIG. 1). Coupler 34 can be coupled to wiper arm 16 through one or more of a rivet, bolt and nut, pin and clevis, and pin and clamp, among other options. In the embodiment shown, coupler 34 is constructed from a metallic material. In other embodiments, coupler 34 can be constructed from a polymer or a composite material, among other options.

As shown best in FIG. 2B, wash tube 32 is an aperture that extends fully through support member 26, from first end 26A of support member 26 to second end 26B of support member 26. As such, wash tube 32 is integral with and positioned within support member 26. Wash tube 32 is a tubular feature extending through a central portion of support member 26 that allows fluids to flow through wash tube 32 within support member 26. In the embodiment shown, wash tube 32 has a circular cross-sectional shape when viewing in the axial direction of wash tube 32. In other embodiments, wash tube 32 can have any desired cross-sectional shape when viewing in the axial direction of wash tube 32. Referring to FIG. 2A or 2C, wiper blade 14 also includes plugs 38 positioned at first end 26A and second end 26B of wash tube 32. More specifically, plugs 38 are inserted within ends 26A, 26B of wash tube 32 and plugs 38 prevent fluid from flowing out through each end 26A, 26B of wash tube 32. Plugs 38 can be coupled to wash tube 32 through one or more of a friction fit, an adhesive, and a composite fusion process, among other fluid tight options. In the embodiment shown, plugs 38 have an outer diameter that is smaller than the diameter of wash tube 32, which allows plugs 38 to be inserted within wash tube 32. In the embodiment shown, plugs 38 have a circular cross-sectional shape when viewing in the axial direction of plugs 38. In other embodiments, plugs 38 can have any desired cross-sectional shape that conforms to the cross-sectional shape of wash tube 32. Further, plugs 38 can be constructed from the same or similar composite material as support member 26.

Wiper blade 14 also includes a plurality of nozzles 40 and fluid input 42 (FIG. 2B). Nozzles 40 are spaced along a length of support member 26 and nozzles 40 extend into support member 26, providing a location in which the fluid flowing through wash tube 32 can dispense or exit wash tube 32 onto windshield 12 of the aircraft. In some examples, each nozzle 40 can be an aperture extending from an outer surface of support member 26 to wash tube 32 within the central portion of support member 26. As such, wash tube 32 is fluidly coupled to each of the plurality of nozzles 40. Nozzles 40 are configured to increase the pressure and velocity of the fluid as the fluid dispenses through nozzles 40. In the embodiment shown, support member 26 includes eight nozzles 40 spaced along a length of support member 26. In another embodiment, support member 26 can include more or fewer than eight nozzles 40 spaced along the length of support member 26. The number of nozzles 40 will vary depending on the length of wiper blade 14 and the fluid requirements for each specific application. Further, nozzles 40 are positioned adjacent the initial sweep side of wiper blade 14. In other words, if wiper blade 14 initially sweeps in a left direction when WWS 10 is activated, nozzles 40 are also positioned on the left side of wiper blade 14. Likewise, if wiper blade 14 initially sweeps in a right direction when WWS 10 is activated, nozzles 40 are also positioned on the right side of wiper blade 14. Positioning nozzles 40 on the initial sweep side of wiper blade 14 allows fluid to dispense onto windshield 12 in front of wiper blade 14 before wiper blade 14 sweeps across an area of windshield 12.

Referring to FIG. 2B, fluid input 42 is an aperture that extends into support member 26 and fluidly connects to wash tube 32 within support member 26. Fluid input 42 is positioned at approximately the center of support member 26 in the lengthwise direction of support member 26. Fluid input 42 fluidly connects fluid line 24 (FIG. 1) and wash tube 32, providing a flow path for fluid to flow from fluid line 24 into wash tube 32. More specifically, referring to FIG. 2C, fluid flows from fluid line 24 into input port 44, and then the fluid flows from input port 44 into fluid input 42 of support member 26. Input port 44 is a tube, channel, valve, orifice, or the like, that is axially aligned with fluid input 42 and input port 44 extends through and is coupled to coupler 34. More specifically, input port 44 extends through an aperture within coupler 34 and input port 44 is coupled to coupler 34 through a braze or weld connection. As such, input port 44 and coupler 34 can be constructed from a metallic material, facilitating the brazed or welded connection between the components.

Further, the end of input port 44 extending within fluid input 42 of support member 26 is coupled to fluid input 42 of support member 26 through an adhesive connection. Brazing or welding input port 44 to coupler 34 and coupling input port 44 to support member 26 through an adhesive connection provides additional support and connection between support member 26 and coupler 34. Input port 44 provides a connection and flow path between fluid line 24 and fluid input 42, allowing fluid to flow from fluid input 42 through input port 44 and into fluid input 42. As such, in operation fluid is transferred from fluid source 22 through fluid line 24, the fluid travels through fluid line 24 to input port 44, the fluid flows through input port 44 and into fluid input 42, the fluid flows through fluid input 42 and into wash tube 32, and then the fluid flows through wash tube 32 and dispenses through the plurality of nozzles 40 onto windshield 12 of the aircraft.

Figure 3:
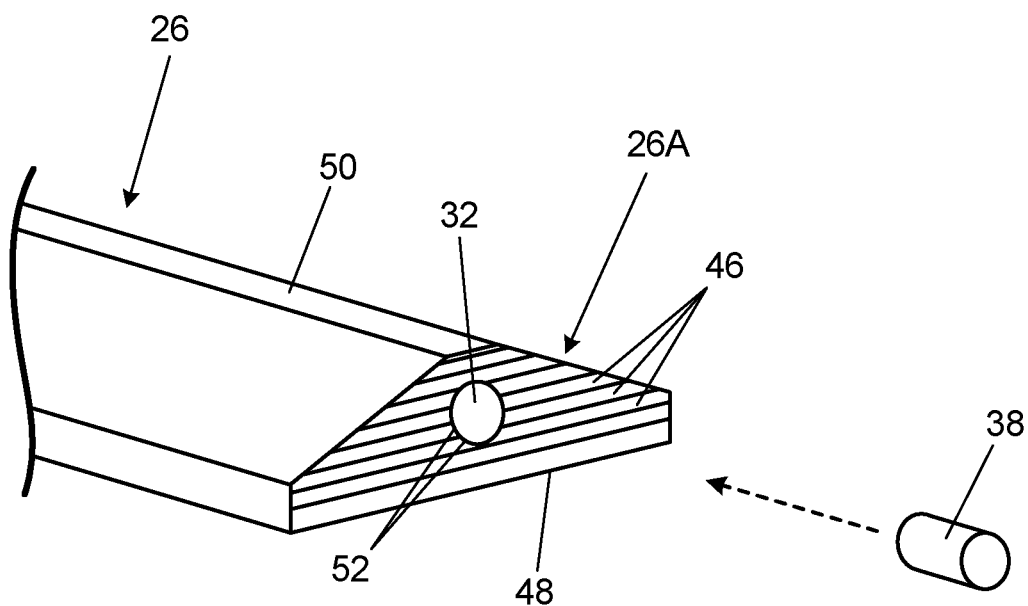
FIG. 3 is a close-up perspective view of an end of the composite support member of the wiper blade.

FIG. 3 is a close-up perspective view of an end of support member 26 of wiper blade 14 with plug 38 removed. In other words, plug 38 is shown removed from wash tube 32, illustrating how plug 38 is inserted into each end 26A, 26B of wash tube 32 to prevent fluid leakage through ends 26A, 26B of wash tube 32. Further, FIG. 3 illustrates an example material configuration for support member 26. As mentioned, support member 26 can be constructed from a composite material, such as a carbon fiber reinforced polymer, polytetrafluoroethylene (PTFE) composite material, or other comparable composite material. The material properties listed allow wash tube 32 to be located within the central portion of support member 26 while maintaining the requisite stiffness and strength characteristics of support member 26, preventing undesirable deflection of wiper blade 14 during operation of WWS 10 that can lead to under-sweep and over-sweep conditions.

In some examples, support member 26 can be constructed from a plurality of composite plies 46 stacked in a vertical direction from base 48 of support member 26 to top 50 of support member 26. Base 48 of support member 26 is the bottom surface of support member 26 that is positioned adjacent and contacts a portion of blade element 28 (FIG. 2A). Top 50 of support member 26 is the upper surface or edge of support member 26 that is positioned adjacent the point of the triangular shaped support member 26. In the vertically stacked configuration, each of the plurality of composite plies 46 extends in a horizontal direction from first end 26A of support member 26 to second end 26B of support member 26 (FIGS. 2A-2B). In other examples, support member 26 can be constructed from a plurality of composite plies 46 stacked or positioned in any direction or orientation.

Further, in some examples, at least one of the plurality of composite plies 46 can include cutout feature 52. Cutout feature 52 is a notch or indentation along an edge or surface of an individual composite ply 46. Further, cutout feature 52 can be a same or differing shape as an adjacent cutout feature 52 of an adjacent composite ply 46. A plurality of cutout features 52 of the at least one of the plurality of composite plies 46 forms wash tube 32 within the central portion of support member 26. In other words, cutout features 52 are produced during the layup process of each individual ply 46 of support member 26. Once the plurality of composite plies 46 are stacked in the vertical direction, the plurality of cutout features 52 form wash tube 32 extending through a central portion of support member 26. In other examples, each of the plurality of composite plies 46 can have a continuous, uninterrupted cross-section through a length and thickness of each individual ply 46. As such, once the plurality of composite plies 46 are stacked in the vertical direction, support member 26 has a solid cross-section before wash tube 32 is machined into support member 26. Following the layup process, wash tube 32 can be produced by a drilling operation from first end 26A of support member 26 to second end 26B of support member 26. In addition, each of the plurality of nozzles 40 can be produced by a drilling operation from an outer surface of support member 26 to wash tube 32 within the central portion of support member 26. As such, wash tube 32 can be produced either during the layup process of the composite plies 46 and support member 26 or wash tube 32 can be produced using a machining operation after the layup of support member 26.

Previous windshield wiper systems with metallic supports have a wash tube welded or brazed to the metallic support member for providing fluid adjacent the wiper blade sweeping across the windshield. Windshield wiper systems with composite supports cannot include welded or brazed fluid tubes along the length of the wiper blade. WWS 10 including wiper blade 14 and wash tube 32 within support member 26 provides a solution for enabling the use of composite supports on wiper blades while also enabling the windshield wiper system to dispense fluid onto the windshield of the aircraft. Further, wash tube 32 being integral with and positioned within a central portion of support member 26 eliminates the need for a separate wash tube, reduces the number of components within the wiper blade assembly and the overall WWS 10, and reduces the overall weight of WWS 10. Therefore, WWS 10 provides the benefit of decreasing over-sweep and under-sweep by utilizing composite support member 26, and also provides the capability to dispense a fluid onto windshield 12 of the aircraft to aid in cleaning windshield 12 to improve visibility for both the pilot and copilot operating the aircraft.

DISCUSSION OF POSSIBLE EMBODIMENTS

The following are non-exclusive descriptions of possible embodiments of the present invention.

A wiper blade for use on a windshield of an aircraft, the wiper blade comprising a support member coupled to a blade element, wherein the support member is constructed from a composite material; a wash tube extending through a central portion of the support member; and a plurality of nozzles spaced along a length of the support member, wherein the wash tube is fluidly coupled to the plurality of nozzles.

The wiper blade of the preceding paragraph can optionally include, additionally and/or alternatively, any one or more of the following features, configurations and/or additional components:

The wash tube is an aperture that extends fully through the support member, from a first end of the support member to a second end of the support member.

The plurality of nozzles are apertures that extend from an outer surface of the support member to the wash tube within the central portion of the support member.

The support member is constructed from a plurality of composite plies stacked in a vertical direction from a base of the support member to a top of the support member.

The base of the support member is adjacent and contacting a portion of the blade element.

Each of the plurality of composite plies extends from a first end of the support member to a second end of the support member.

At least one of the plurality of composite plies comprises a cutout feature, and wherein a plurality of the cutout features of the at least one of the plurality of composite plies forms the wash tube within the central portion of the support member.

Each of the plurality of composite plies has a continuous, uninterrupted cross-section through a length and thickness of each individual ply.

The wash tube is produced by a drilling operation from a first end of the support member to a second end of the support member.

The plurality of nozzles are produced by a drilling operation from an outer surface of the support member to the wash tube within the central portion of the support member.

The support member is constructed from one or more of a carbon fiber reinforced polymer and a polytetrafluoroethylene (PTFE) composite material, and wherein the blade element is constructed from a nitrile rubber.

A plug positioned at each distal end of the wash tube.

An outer diameter of each plug is smaller than a diameter of the wash tube, and wherein the plugs are inserted into both distal ends of the wash tube.

Each of the plugs are constructed from the same material as the support member.

A fluid input extending into the support member and fluidly connecting to the wash tube within the support member, wherein the fluid input is an aperture that is positioned at approximately a center of the support member with respect to a length of the support member.

An input port axially aligned with and coupled to the fluid input of the support member, wherein the input port fluidly couples the fluid input of the support member to a fluid source.

A coupler coupled to and surrounding at least a portion of the support member and at least a portion of the blade element, wherein the input port extends through and is coupled to the coupler.

A fluid line is positioned between and fluidly couples the input port to the fluid source.

A fluid flows from the fluid source through the fluid line to the input port; the fluid flows through the input port into the fluid input; the fluid flows through the fluid input into the wash tube; and the fluid flows through the wash tube and dispenses through the plurality of nozzles onto the windshield of the aircraft.

The wiper blade comprises a plurality of clips, and wherein each of the plurality of clips are coupled to and surround at least a portion of the support member and at least a portion of the blade element.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A wiper blade for use on a windshield of an aircraft, the wiper blade comprising:
   a support member coupled to a blade element, wherein the support member is constructed from a composite material;
   a wash tube extending through a central portion of the support member;
   a plurality of nozzles spaced along a length of the support member, wherein the wash tube is fluidly coupled to the plurality of nozzles;
   a plurality of clips, wherein each of the plurality of clips are coupled to and surround at least a portion of the support member and at least a portion of the blade element;
   a fastener extending through each of the plurality of clips, wherein each fastener is configured to extend only through each of the plurality of clips and a rectangular top portion of the blade element to secure each of the plurality of clips to the blade element together in compression;
   a fluid input extending into the support member and fluidly connecting to the wash tube within the support member, wherein the fluid input is an aperture that is positioned at approximately a center of the support member with respect to a length of the support member;

an input port axially aligned with and coupled to the fluid input of the support member, wherein the input port fluidly couples the fluid input of the support member to a fluid source; and a coupler coupled to and surrounding at least a portion of the support member and at least a portion of the blade element, wherein the input port extends through and is coupled to the coupler.

2. The wiper blade of claim 1, wherein the wash tube is an aperture that extends fully through the support member, from a first end of the support member to a second end of the support member.

3. The wiper blade of claim 1, wherein the plurality of nozzles are apertures that extend from an outer surface of the support member to the wash tube within the central portion of the support member.

4. The wiper blade of claim 1, wherein the support member is constructed from a plurality of composite plies stacked in a vertical direction from a base of the support member to a top of the support member.

5. The wiper blade of claim 4, wherein the base of the support member is adjacent and contacting a portion of the blade element.

6. The wiper blade of claim 4, wherein each of the plurality of composite plies extends from a first end of the support member to a second end of the support member.

7. The wiper blade of claim 4, wherein at least one of the plurality of composite plies comprises a cutout feature, and wherein a plurality of the cutout features of the at least one of the plurality of composite plies forms the wash tube within the central portion of the support member.

8. The wiper blade of claim 4, wherein each of the plurality of composite plies has a continuous, uninterrupted cross-section through a length and thickness of each individual ply.

9. The wiper blade of claim 8, wherein the wash tube is produced by a drilling operation from a first end of the support member to a second end of the support member.

10. The wiper blade of claim 1, wherein the plurality of nozzles are produced by a drilling operation from an outer surface of the support member to the wash tube within the central portion of the support member.

11. The wiper blade of claim 1, wherein the support member is constructed from one or more of a carbon fiber reinforced polymer and a polytetrafluoroethylene (PTFE) composite material, and wherein the blade element is constructed from a nitrile rubber.

12. The wiper blade of claim 1, and further comprising a plug positioned at each distal end of the wash tube.

13. The wiper blade of claim 12, wherein an outer diameter of each plug is smaller than a diameter of the wash tube, and wherein the plugs are inserted into both distal ends of the wash tube.

14. The wiper blade of claim 12, wherein each of the plugs are constructed from the same material as the support member.

15. The wiper blade of claim 1, wherein a fluid line is positioned between and fluidly couples the input port to the fluid source.

16. The wiper blade of claim 15, wherein:
a fluid flows from the fluid source through the fluid line to the input port;
the fluid flows through the input port into the fluid input;
the fluid flows through the fluid input into the wash tube; and
the fluid flows through the wash tube and dispenses through the plurality of nozzles onto the windshield of the aircraft.

* * * * *